(12) United States Patent
Zhou et al.

(10) Patent No.: US 8,411,461 B2
(45) Date of Patent: Apr. 2, 2013

(54) MOUNTING APPARATUS FOR EXPANSION CARDS

(75) Inventors: Hai-Qing Zhou, Shenzhen (CN); Chung-Chi Huang, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 257 days.

(21) Appl. No.: 12/978,525

(22) Filed: Dec. 24, 2010

(65) Prior Publication Data

US 2012/0147581 A1    Jun. 14, 2012

(30) Foreign Application Priority Data

Dec. 9, 2010    (CN) .......................... 2010 1 0580860

(51) Int. Cl.
*H05K 7/14* (2006.01)
*H05K 7/18* (2006.01)

(52) U.S. Cl. ...................................................... 361/801

(58) Field of Classification Search ........................ None
See application file for complete search history.

(56) References Cited

U.S. PATENT DOCUMENTS

| | | | | |
|---|---|---|---|---|
| 6,160,712 A * | 12/2000 | Itai et al. | ........................ | 361/759 |
| 6,185,104 B1 * | 2/2001 | Obermaier | ................... | 361/759 |
| 6,618,264 B2 * | 9/2003 | Megason et al. | ............. | 361/759 |
| 6,693,802 B2 * | 2/2004 | Vier et al. | ...................... | 361/801 |
| 7,012,813 B2 * | 3/2006 | Wang et al. | .................... | 361/801 |
| 7,057,902 B2 * | 6/2006 | Li | ................ | 361/801 |
| 7,254,040 B2 * | 8/2007 | Barina et al. | .................. | 361/801 |
| 7,265,997 B2 * | 9/2007 | Jing | ............ | 361/801 |
| 7,545,650 B2 * | 6/2009 | Sanchez et al. | ............... | 361/759 |
| 7,561,440 B2 * | 7/2009 | Dai | .............. | 361/801 |
| 7,715,199 B2 * | 5/2010 | Chou | ........................... | 361/732 |
| 2009/0296358 A1 * | 12/2009 | Tsai | ............... | 361/759 |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

A mounting apparatus for mounting an expansion card with a cover plate to a rear panel includes a retaining member fixed to the rear panel, and a pressing member slidably attached to the retaining member. The pressing member can be slid down to press the cover plate of the expansion card. The pressing member can be slid up to release the cover plate of the expansion card.

16 Claims, 5 Drawing Sheets

MOUNTING APPARATUS FOR EXPANSION CARDS

BACKGROUND

1. Technical Field

The disclosure relates to mounting apparatuses and, more particularly, to a mounting apparatus for mounting expansion cards.

2. Description of Related Art

Modern computer systems, such as servers, workstations, and personal computers, include expansion cards electrically connected to motherboards or circuit boards to enhance the capacity or functionality of the computer systems. An expansion card generally has a cover plate attached to a side of the expansion card. The cover plate includes an outward-extending tab. When the expansion card is plugged into a connector in a computer enclosure, the cover plate is inserted into a card slot defined in a rear panel of the computer enclosure. Screws are used to secure the tab to a support wall on the rear panel by a screwdriver. The screwdriver is also used to disassemble the screws when removing the expansion card. It is inconvenient and time-consuming to install or remove the expansion card with the screwdriver.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
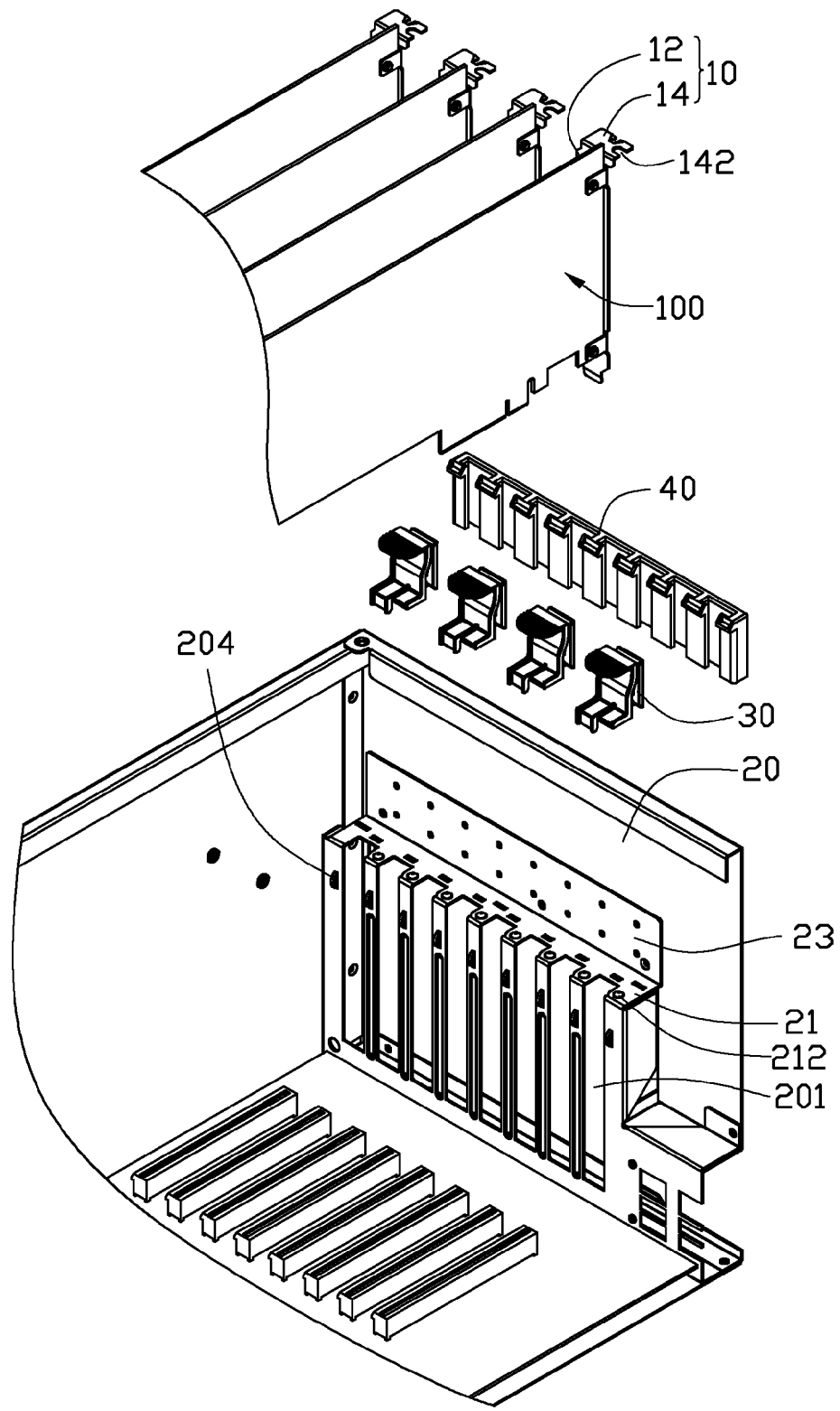
FIG. 1 is an exploded, isometric view of an exemplary embodiment of a mounting apparatus, together with a plurality of expansion cards, the mounting apparatus includes a retaining member and a number of pressing members.

Referring to FIG. 1, an exemplary embodiment of a mounting apparatus is provided to mount a plurality of expansion cards 100 to a rear panel 20 of a computer enclosure (not labeled in the figures). The mounting apparatus includes a retaining member 40 and a plurality of pressing members 30.

Each expansion card 100 includes a circuit board (not labeled) and a cover plate 10 attached to a side of the circuit board. The cover plate 10 includes a cover portion 12 mounted to the circuit board (not labeled) and a bent portion 14 extending from one end of the cover portion 12. A notch 142 is defined in the bent portion 14.

The rear panel 20 defines a plurality of elongated card slots 201. The card slots 201 are parallel to each other. Two blocks 204 are defined on the rear panel 20 at opposite sides of each card slot 201. A support wall 21 is substantially perpendicularly defined from the rear panel 20, above the card slots 201. A substantially rectangular mounting plate 23 is defined on the rear panel 20, adjacent and substantially perpendicular to the support wall 21. A raised portion 212 protrudes from the support wall 21 between every two adjacent card slots 201.

Figure 2:
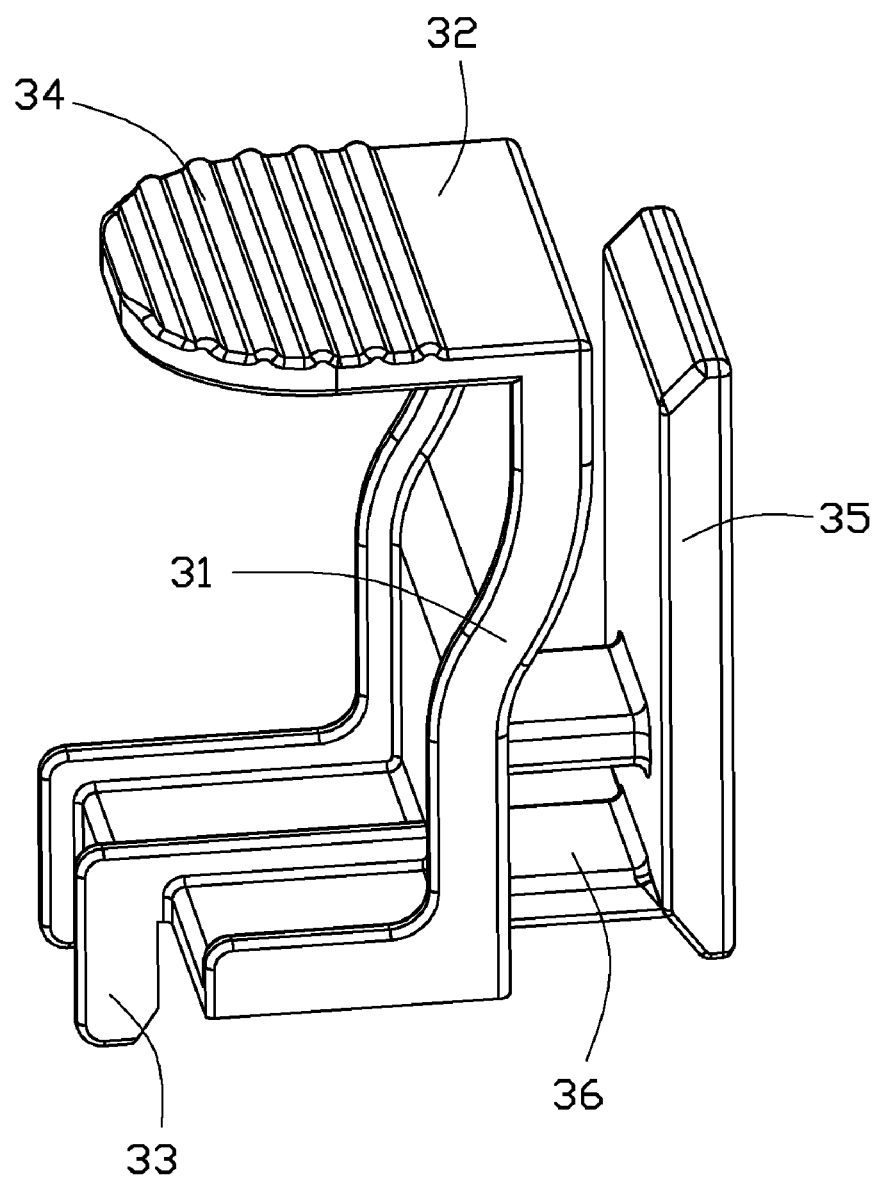
FIG. 2 is an enlarged view of one of the pressing members of FIG. 1, but viewed from another perspective.

Referring to FIG. 2, each pressing member 30 includes a resilient main body 31, a stop portion 32 extending from an upper portion of the main body 31, a substantially L-shaped pressing portion 33 extending from a lower portion of the main body 31, a handle 34 extending from a distal end of the stop portion 32, and a substantially rectangular sliding portion 35 extending from the main body 31 opposite to the handle 34. At least one connecting portion 36 is connected between the main body 31 and the sliding portion 35.

Figure 3:
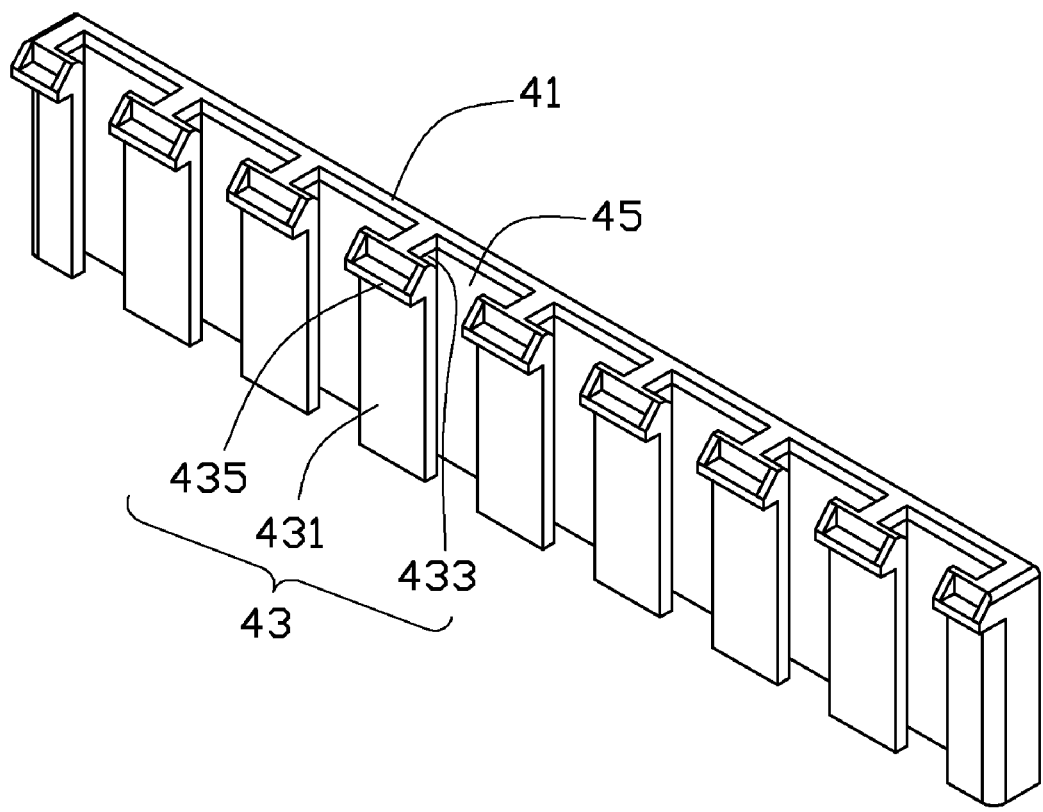
FIG. 3 is an enlarged view of the retaining member of FIG. 1.

Referring to FIG. 3, the retaining member 40 is substantially bar shaped and includes a main plate 41 and a plurality of parallel limiting blocks 43. Each limiting block 43 has a substantially T-shaped cross section, and includes a main piece 431 parallel to and spaced from the main plate 41. A connecting piece 433 substantially perpendicularly connected between the main plate 41 and the main piece 431, and a positioning portion 435 protruding from an upper portion of the main piece 431 and opposite to the main plate 41. Every two adjacent limiting blocks 43 and the main plate 41 bind a sliding slot 45.

Figure 4:
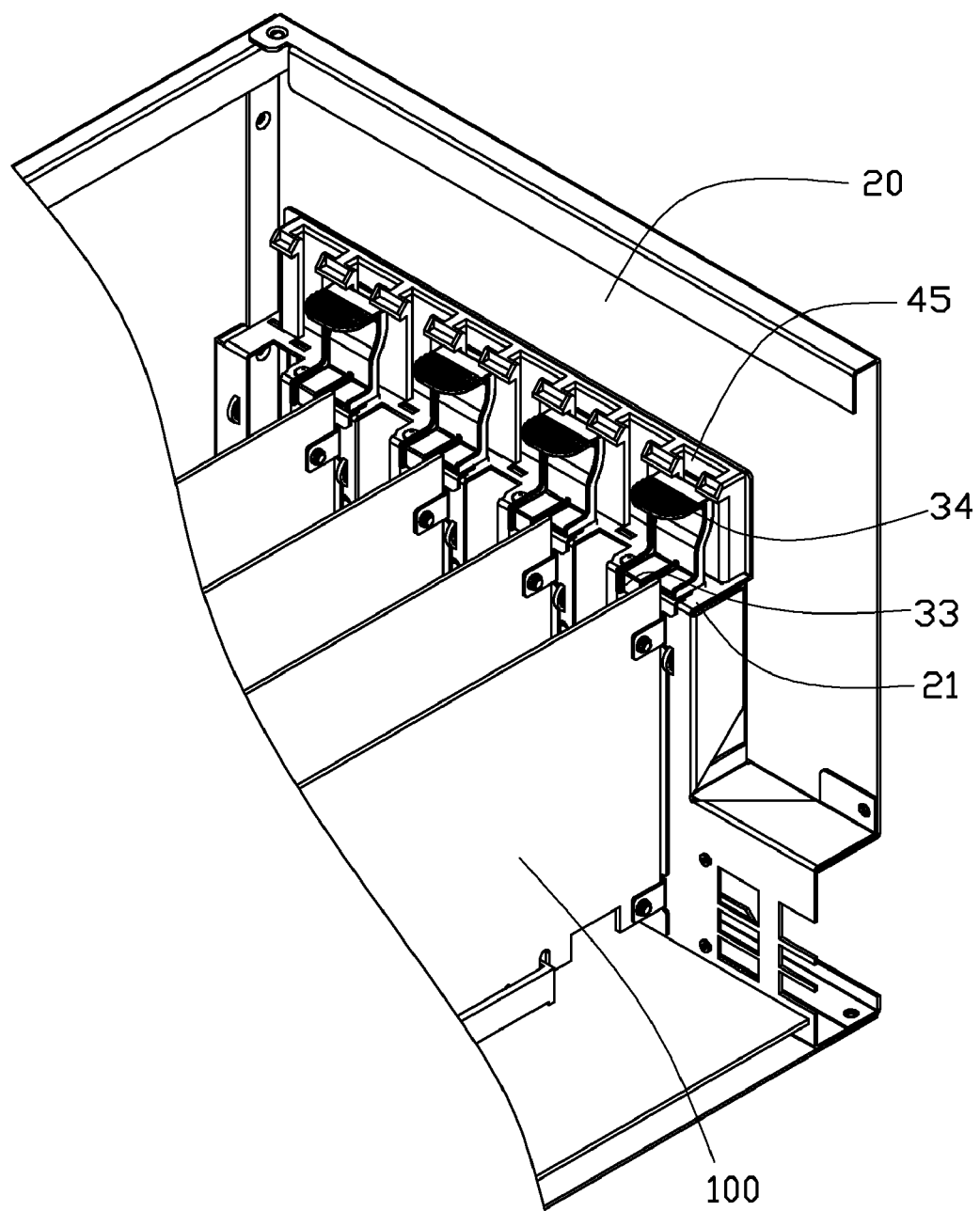
FIG. 4 is an assembled, isometric view of FIG. 1.
Figure 5:
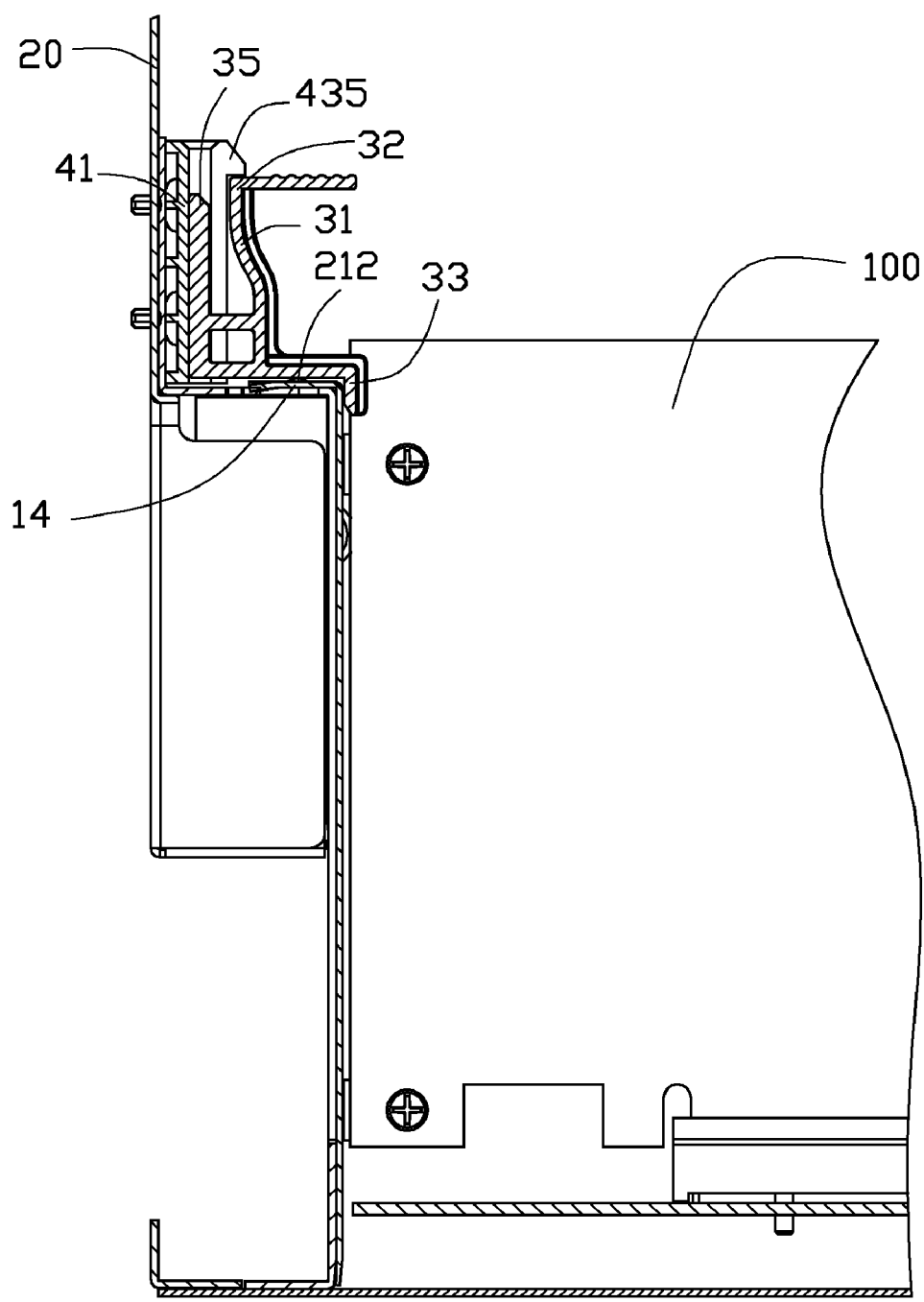
FIG. 5 is a cross-sectional view of FIG. 4.

Referring to FIGS. 4 and 5, in assembly, the retaining member 40 is fixed to the mounting plate 23 of the rear panel 20 by screws or hot melting. The sliding portion 35 of each pressing member 30 is slidably received in one of the sliding slots 45 of the retaining member 40.

To assemble the expansion cards 100, the expansion cards 100 are inserted into connectors (not labeled) of a motherboard (not labeled) or a circuit board (not labeled) accommodated in the computer enclosure. The cover plate 10 of each expansion card 100 is attached to the rear panel 20 between two adjacent blocks 204, with the cover portion 12 covering the card slot 201 in the rear panel 20 between the blocks 204. The cover portion 12 is limited between the blocks 204. The bent portion 14 is positioned on the support wall 21. The notch 142 of the bent portion 14 receives the corresponding raised portion 212. The operating portion 34 is operated to slide the pressing member 30 down along the sliding slot 45 of the retaining member 40, until the pressing portion 33 of the pressing member 30 engages with the cover plate 10 of the expansion card 100 to retain the expansion card 100 to the rear panel 20. The stop portion 32 of the pressing member 30 is stopped under the corresponding two adjacent positioning portions 435 of the retaining member 40 to avoid the pressing portion 33 of the pressing member 30 from disengaging from the cover plate 10 of the expansion card 100.

To detach the expansion cards 100, the operating portion 34 of each pressing member 30 is operated to deform the main body 31 of the pressing member 30 to release the stop portion 32 of each pressing member 30 from the positioning portions 435 of the retaining member 40. Then each pressing member 30 is slid up along the sliding slot 45 of the retaining member 40. The pressing portion 33 of each pressing member 30 is disengaged from the cover plate 10 of each expansion card 100. After that, the expansion cards 100 can be readily removed from the rear panel 20.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for mounting an expansion card with a cover plate to a rear panel, comprising:
   a retaining member fixed to the rear panel, the retaining member defining a sliding slot and comprises a positioning portion at a side of the sliding slot; and
   a pressing member comprising a stop portion, a pressing portion, and a sliding portion to be slidably received in the sliding slot of the retaining member;
   wherein, when in use, the pressing member is slid down along the sliding slot of the retaining member to make the pressing portion of the pressing member press the cover plate of the expansion card, the stop portion of the pressing member is stopped under the positioning portion of the retaining member to avoid the pressing portion of the pressing member disengaging from the cover plate of the expansion card; and
   wherein the retaining member comprises a main plate and two parallel limiting blocks, each limiting block has a substantially T-shaped cross section and comprises a main piece parallel to and spaced from the main plate, a connecting piece is substantially perpendicularly connected between the main plate and the main piece, the positioning portion protrudes on an upper portion of the main piece, and the sliding slot is bounded by the limiting blocks and the main plate.

2. The mounting apparatus of claim 1, wherein the rear panel defines a card slot, a support wall is substantially perpendicularly formed from the rear panel, above the card slot, the cover plate of the expansion card is inserted into the card slot, with the cover plate positioned on the support wall.

3. The mounting apparatus of claim 2, wherein the rear panel comprises a mounting plate adjacent and substantially perpendicular to the support wall, the retaining member is fixed to the mounting plate.

4. The mounting apparatus of claim 2, wherein a raised portion protrudes on the support wall to engage with the cover plate of the expansion card.

5. The mounting apparatus of claim 2, wherein two blocks are formed on the rear panel at opposite sides of the card slots, to limit the cover plate between the blocks.

6. The mounting apparatus of claim 1, wherein the pressing member comprises a resilient main body, the stop portion extends from an upper portion of the main body, the pressing portion extends from a lower portion of the main body.

7. The mounting apparatus of claim 6, wherein the pressing portion of the pressing member is substantially L-shaped.

8. The mounting apparatus of claim 6, wherein a handle extends from a distal end of the stop portion opposite to the sliding portion.

9. The mounting apparatus of claim 8, wherein at least one connecting portion is connected between the main body and the sliding portion.

10. An electronic device comprising:
    a rear panel defining a plurality of card slots, a support wall substantially perpendicularly formed from the rear panel, above the card slots;
    a plurality of expansion cards each with a cover plate covering a corresponding one of the plurality of the card slots, the cover plate comprising a bent portion positioned on the support wall;
    a retaining member fixed to the rear panel above the support wall, the retaining member defining a plurality of sliding slots and comprising a plurality of positioning portions corresponding to each of the plurality of sliding slots; and
    a plurality of pressing members each comprising a stop portion, a pressing portion, and a sliding portion slidably received in the sliding slots of the retaining member;
    wherein the pressing members are slid down along the sliding slots of the retaining member to make the pressing portions of the pressing members press the cover plates of the expansion cards, the stop portions of the pressing members are stopped under the positioning portions of the retaining member to avoid the pressing portions of the pressing members disengaging from the bent portions of the expansion cards; and
    wherein the retaining member comprises a main plate and a plurality of parallel limiting blocks, each limiting block has a substantially T-shaped cross section and comprises a main piece parallel to and spaced from the main plate, a connecting piece is connected between the main plate and the main piece, the positioning portion protrudes on an upper portion of the main piece, and each of the sliding slots is bounded by two adjacent limiting blocks and the main plate.

11. The electronic device of claim 10, wherein a notch is defined in each of the bent portions, a plurality of raised portions protrude on the support wall to engage in the notches respectively.

12. The electronic device of claim 10, wherein two blocks are formed on the rear panel at opposite sides of each of the card slots, each of the cover plates is limited between the blocks.

13. The electronic device of claim 12, wherein each of the pressing members comprises a resilient main body, the stop portion extends from an upper portion of the main body, the pressing portion extends from a lower portion of the main body.

14. The electronic device of claim 13, wherein the pressing portion of each of the pressing member is substantially L-shaped.

15. The electronic device of claim 14, wherein a handle extends from a distal end of the stop portion opposite to the sliding portion.

16. The electronic device of claim 15, wherein at least one connecting portion is connected between the main body and the sliding portion.

* * * * *